United States Patent [19]

Mahlein

[11] 4,009,453
[45] Feb. 22, 1977

[54] NARROW-BAND INTERFERENCE FILTER AND ITS APPLICATION IN A LASER SYSTEM

[75] Inventor: Hans Mahlein, Munich, Germany

[73] Assignee: Siemens Aktiengesellschaft, Berlin & Munich, Germany

[22] Filed: Oct. 14, 1975

[21] Appl. No.: 622,131

[30] Foreign Application Priority Data

Oct. 16, 1974 Germany .................. 2449312

[52] U.S. Cl. .................. 331/94.5 C; 350/166
[51] Int. Cl.$^2$ .................. H01S 3/08
[58] Field of Search .......... 331/94.5; 350/164, 166

[56] References Cited
UNITED STATES PATENTS

| | | | |
|---|---|---|---|
| 3,422,370 | 1/1969 | Collins, Jr. | 331/94.5 S |
| 3,579,130 | 5/1971 | Smiley | 331/94.5 C |
| 3,649,359 | 3/1972 | Apfel et al. | 350/166 |

Primary Examiner—William L. Sikes
Attorney, Agent, or Firm—Hill, Gross, Simpson, Van Santen, Steadman, Chiara & Simpson

[57] ABSTRACT

A narrow-band interference filter comprises a plurality of alternating reflective dielectric layer systems arranged in a serial sequence in layer form on a substrate. Each system has a construction pattern $(HL)^2H$, and a pair of spacing layers LL is arranged between adjacent layer systems. An H layer has a high index of refraction, and an L layer has a low index of refraction, the H and L layers being of the same optical thickness. A plurality of absorbent metal layers are interposed into the layer arrangement to act asymmetrically in relation to the reflection of light passing through the layers, the metal layers having thicknesses which are less than the geometrical thicknesses of the layers H and L. The filter, because of the asymmetrical reflection characteristic has an infinitesimal reflection for light passing therethrough in one direction. For an interposed with an active laser medium within a resonator having a pair of reflectors the filter forms a subsidiary resonator with one of the reflectors.

5 Claims, 2 Drawing Figures

A  H L H M L H M L L M H L M H L H  S

NARROW-BAND INTERFERENCE FILTER AND ITS APPLICATION IN A LASER SYSTEM

BACKGROUND OF THE INVENTION

1. Field of the Invention

This invention relates to a narrow-band interference filter, and more particularly to such a filter which comprises a plurality of alternating reflective layers arranged in a series in the form of layers on a substrate, and having a construction pattern $(HL)^2H$ with spacing layers LL arranged between the alternating reflective layers, where the H layers have a high index of refraction and the L layers have a low index of refraction and the same optical thickness as the H layers.

2. Description of the Prior Art

In optical communications transmission systems having guided waves, the output of a communications link should have the least possible reactive effect on its input in order to keep the interference in the entire system as small as possible. When a narrow-band interference filter is provided in an optical communications transmission system, it is also necessary that the light signals should not be reflected on the filter at the beginning of a line.

In accordance with the observations set forth by H. A. Macleod in his book "Thin Film Optical Filters", A. Hilger Ltd., London, 1969, practically reflection-free interference filters can be constructed from dielectric layers arranged on a substrate if dielectric matching layers are additionally interposed, which layers are generally arranged both between the filter layer system and the substrate, and also between the filter layer system and the medium from which radiation emanates.

In practice, this is the equivalent of coating the entire filter layer system. As a matched interference filter of this type consists only of dielectric, non-absorbent layers, it is symmetrical in respect of its optical properties, i.e., it possesses infinitesimal reflection on both sides.

SUMMARY OF THE INVENTION

The object of the present invention is to provide a narrow-band interference filter which has infinitesimal reflection on only one side.

The above object is realized in an interference filter of the type generally described above in that, for the production of an infinitesimal reflection on one side, absorbent metal layers are interposed between the dielectric layers. The metal layers have thicknesses which are less than the geometrical thicknesses of the dielectric layers and act asymmetrically in relation to the reflection of light.

A filter constructed according to the above transmits incoming light signals only with a very narrow frequency band. When the light signals pass through the filter in one direction, transversely through the layer construction, their reflection is zero, and the rear of the substrate which, considered in the beam direction, lies at the rear of the layer construction, is coated. A reflection component of the light signals exists, however, in the opposite direction.

Advantageously, the interference filter which exhibits infinitesimal reflection on one side can also be used in optical resonators of lasers. If, in fact, such interference filter is arranged between the two reflectors of an optical resonator, the infinitesimal reflection on one side means that only one additional subsidiary resonator is obtained. The overall resonator and the subsidiary resonator are then able to be tuned independently of each other.

BRIEF DESCRIPTION OF THE DRAWING

Other objects, features and advantages of the invention, its organization, construction and operation will be best understood from the following detailed description taken in conjunction with the accompanying drawing, and on which.

DESCRIPTION OF THE PREFERRED EMBODIMENT

Figure 1:
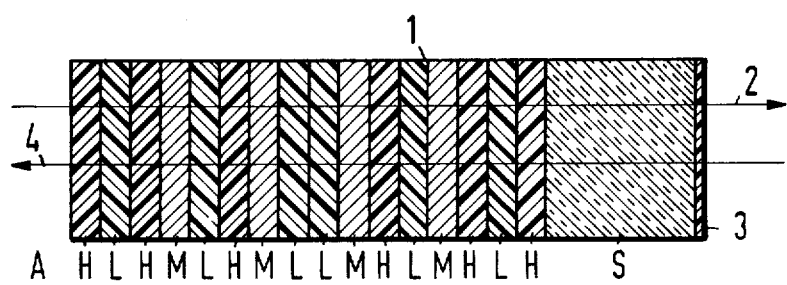
FIG. 1 is a schematic representation of a narrow-band interference filter constructed in accordance with the invention.

Referring to FIG. 1, a narrow-band interference filter is illustrated, which filter is obtained by interposing metal layers M into a known layer construction $S(HL)^2H$ LL $(HL)^2$ H A of a dielectric interference filter. In this layer construction, the layer sequence $(HL)^2H$ in each case signifies an alternating reflective layer or layer system, and the layer sequence LL identifies a spacing component.

Here, the metal layers M are interposed in each alternating reflective layer system and between each alternative reflective system and the adjacent spacing layer, so that one obtains the layer sequence 1 of (SHL HML HMLL MHL MHL HA).

If glass having an index of refraction of approximately 1.5 is utilized as the material for the substrate S, ZnS having a high index of refraction is used for the layers H, $MgF_2$ having a low index of refraction is used for the layers L, aluminum is used for the metal layers M, and air is used for the medium A from which the radiation emerges to strike the layer system, then assuming optical layer thickness of approximately 212.5 mm for the layers H and L, and a geometric layer thickness of approximately 10 nm for each layer M, with light signals having a wave length of approximately 885 nm, one obtains a transmission maximum of 56% and an infinitesimal reflection for a light direction corresponding to the arrow 2 when the rear of the layer arrangement 1 is provided with a coating layer 3.

When the light passes through the layer arrangement in the direction of the arrow 4, the reflection capacity amounts to 5% in the case of light signals having a wave length of 885 nm. Therefore, the filter exhibits infinitesimal reflection on one side.

The width at half maximum intensity of the transmission curve differs only slightly from the above-mentioned known layer construction.

Figure 2:
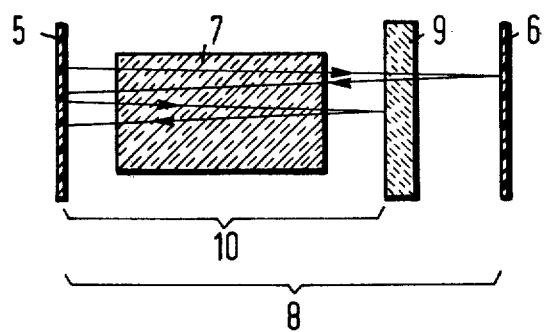
FIG. 2 is a schematic representation of a resonator having an interference filter therein which forms a subsidiary resonator with one of the reflectors of the primary resonator.

Referring to FIG. 2, a laser is illustrated which comprises two reasonators 5 and 6 and an active medium 7. The two resonator reflectors 5 and 6 form the overall resonator 8 of the laser system. If a narrow-band interference filter 9, constructed in accordance with the invention, is now arranged within the resonator 8, one obtains a subsidiary resonator 10 which is formed from the resonator reflector 5 and the interference filter 9. The interference filter 9 is of such a construction and is arranged in the overall resonator 8 in such a manner that for light which strikes the filter 9 from the right-hand side the reflection is infinitesimal, and for light which strikes the filter from the left-hand side, a part of such light is reflected. In this way, one obtains a first beam path between the resonator reflectors 5 and 6 and a second beam path between the resonator reflector 5 and the interference filter 9, as is schematically illustrated in FIG. 2.

By predetermining the spacings between the individual components 5, 6 and 9, in relation to each other, it is possible for the overall resonator 8 and the subsidiary resonator 10 to be tuned independently of each other.

Although I have described my invention by reference to particular illustrative embodiments thereof, many changes and modifications of the invention may become apparent to those skilled in the art without departing from the spirit and scope thereof. I, therefore, intend to include within the patent warranted hereon all such changes and modifications as may reasonably and properly be included within the scope of my contribution to the art.

I claim:

1. In a narrow-band interference filter of the type wherein a plurality of alternating reflective layer structures are arranged in series form on a substrate, each structure having a layer construction pattern $(HL)^2H$, where H denotes a layer with a high index of refraction and L denotes a layer with a low index of refraction, and wherein spacing layers LL are arranged between adjacent layer structures, each of the layers having the same optical thickness, the improvement therein comprising:

means for providing infinitesimal reflection of light traversing the filter in one direction, said means including a plurality of absorbent metallic layers, each of said metallic layers having a thickness less than that of the layers H and L, each of said metal layers interposed between adjacent layers H and L of each of said layer structures, said metal layers asymmetrically effective in relation to reflection to provide reflection of light from one direction and infinitesimal reflection of light from the opposite direction.

2. The improved filter of claim 1, comprising the further improvement of a coating on a surface of said substrate opposite the layers.

3. The improved filter of claim 1, an active laser medium, and a pair of resonator reflectors, said filter and said active medium interposed between said reflectors to form a primary resonator between said reflectors and a subsidiary resonator between said filter and one of said reflectors.

4. A narrow-band interference filter, comprising: a plurality of elements arranged in series as a layer system in the order $S(HL)^2H\ LL\ (HL)^2H\ A$, where S is a substrate, H is a dielectric layer having a high index of refraction, L is a dielectric layer having a low index of refraction, and A is a transmission medium from which light radiation strikes the layer system; and a plurality of metal layers interposed in the layer system to form a layer sequence of SHL HML HMLL MHL MHL HA and M is a metal layer.

5. The filter of claim 4, wherein:

said substrate is glass and has an index of refraction of approximately 1.5;

said layers H are ZnS;

said layers L are $MgF_2$;

said metal layers are Al;

said medium A is air;

the optical layer thicknesses of said layers H and L are approximately 212.5 nm;

the geometric layer thickness of a metal layer is approximately 10 nm; and said substrate carries a coating on the side opposite the layers;

said filter providing a transmission maximum of about 56% and infinitesimal light reflection for light passing through the layers in the direction toward the substrate and a reflection capacity of about 5% for light passing in the opposite direction when the wave length is approximately 885 nm.

* * * * *